UNITED STATES PATENT OFFICE.

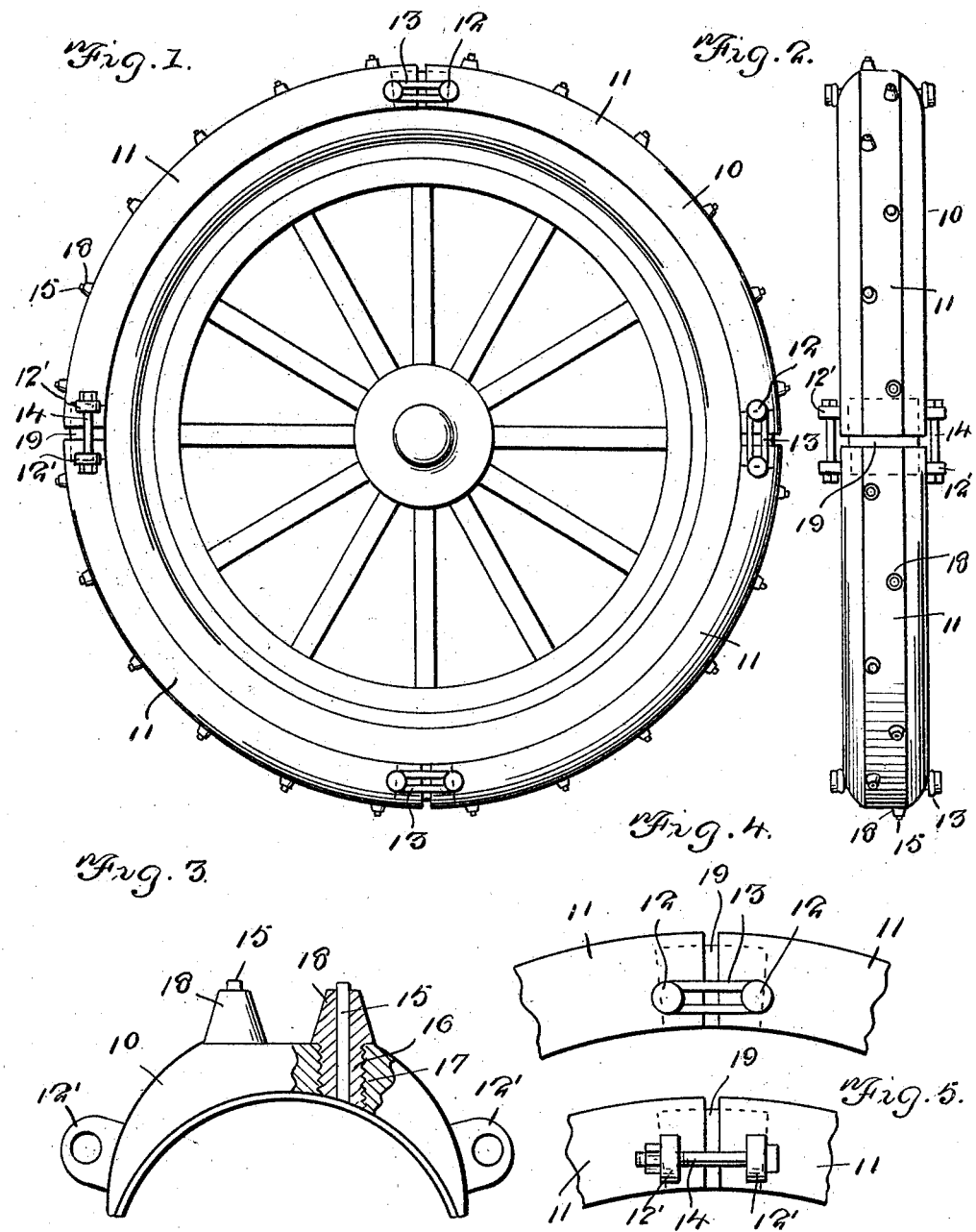

VANCE L. GOSNEY, OF NEW ALEXANDRIA, OHIO.

ANTISKID DEVICE FOR MOTOR-VEHICLES.

1,399,612.  Specification of Letters Patent.  Patented Dec. 6, 1921.

Application filed June 11, 1920. Serial No. 388,318.

*To all whom it may concern:*

Be it known that I, VANCE L. GOSNEY, citizen of the United States of America, residing at New Alexandria, in the county of Franklin and State of Ohio, have invented new and useful Improvements in Antiskid Devices for Motor-Vehicles, of which the following is a specification.

This invention relates to improvements in anti-skid devices and aims to provide an attachment for application to the wheels of motor vehicles for use upon icy or muddy surfaces.

An object of the invention is the provision of a device of this character which may be readily secured around a tire to provide increased traction means and to afford protection for the tire.

A further object is the provision of a novel form of traction lug or calk in which the engaging point will remain shortened so as to positively grip the surface over which the vehicle is traveling.

Other objects and advantages of the invention will appear as the following description is read in connection with the accompanying drawings.

In the drawings:—

Figure 1 is an elevation of a vehicle wheel equipped with the invention.

Fig. 2 is an edge view of the same.

Fig. 3 is an enlarged section taken transversely of the anti-skid device.

Fig. 4 is a fragmentary section showing the link connection between the different sections.

Fig. 5 is a similar view illustrating the adjustable connection between the sections.

Referring specifically to the drawings, wherein like characters of reference denote corresponding parts, the reference character 10 indicates generally a metallic casing which is formed of separate sections 11 which are transversely shaped to conform to the shape of the tire and when joined together form an annulus which entirely surrounds the tread and side wheels of the tire.

Each of these sections is provided upon opposite sides near their ends with headed lugs 12 for the passage of endless links 13, the latter serving to connect the adjacent ends of the sections 11 in a manner to permit of limited relative movement. Connection between the adjacent ends of two of the sections is effected by means of a threaded bolt 14 having a head for engagement with the apertured lugs 12' of one section and a nut mounted upon the opposite ends of the bolts so that these sections may be adjustably secured together to properly position the device upon the tire.

One of the novel features of the invention resides in the provision of spaced lugs or calks which are arranged in staggered relation around the tread of the casing 10. These lugs are formed of a core 15 which is made of relatively hard metal. Surrounding the inner end of the core 15 is a threaded shank 16 for detachable connection with a threaded opening 17 provided in the casing sections 11. The threaded shank 16 has an outer conical member 18 formed of relatively soft metal, the inner end of which abuts the tread of the casing sections to form a stop shoulder. By this means the lugs or calks may be removably secured in position so as to permit their removal and the substitute of new calks when necessary. The outer end of the core projects slightly beyond the point of the conical member 18 and as this last mentioned member is formed of soft metal, it will wear away quicker than the hard metal core so that the lug or calk will always remain short and insure a positive grip upon the surface over which the vehicle is traveling.

The inner concave surface of the casing sections 11 are lined with felt or other cushioning material so as to protect the surface of the tire from wear due to frictional contact with the walls of the casing 10. A liner 19 of metal is placed within the casing to bridge the joints of the casing sections and prevent wear upon the tire.

In the foregoing description and the accompanying drawings, it will be apparent that the invention provides an exceedingly simple and novel anti-skid device which may be easily secured to the tire of a vehicle wheel and when in position will form a positive engaging means with an icy or muddy roadway and prevent the wheel of the vehicle from slipping or skidding.

The invention is susceptible of various changes in its form, proportions and minor details of construction and the right is herein reserved to make such changes as properly fall within the scope of the appended claim.

Having described the invention what is claimed is:—

The combination with a sectional metallic casing adapted to cover the tread and side walls of a tire, of a plurality of relatively soft metallic cone shaped members provided with exteriorly threaded reduced shanks removably secured to said casing, and having shoulders abutting the outer surface of said casing and a plurality of cylindrical cores of relatively hard metal projecting outwardly from said cone shaped members.

In testimony whereof I affix my signature.

VANCE L. GOSNEY.